United States Patent
Lee

(10) Patent No.: US 8,218,301 B2
(45) Date of Patent: Jul. 10, 2012

(54) KEYBOARD

(75) Inventor: Chien-Chung Lee, Taichung Hsien (TW)

(73) Assignee: Sunrex Technology Corporation (TW)

( * ) Notice: Subject to any disclaimer, the term of this patent is extended or adjusted under 35 U.S.C. 154(b) by 423 days.

(21) Appl. No.: 12/583,808

(22) Filed: Aug. 26, 2009

(65) Prior Publication Data

US 2011/0051343 A1 Mar. 3, 2011

(51) Int. Cl.
*G06F 1/16* (2006.01)

(52) U.S. Cl. ......... 361/679.09; 361/679.08; 361/679.17; 400/679; 400/691; 400/692; 400/693; 345/168; 345/169; 235/145 R

(58) Field of Classification Search ............. 361/679.09, 361/679.17
See application file for complete search history.

(56) References Cited

U.S. PATENT DOCUMENTS

| | | | | |
|---|---|---|---|---|
| 4,017,725 A | * | 4/1977 | Roen | 361/679.09 |
| 4,158,230 A | * | 6/1979 | Washizuka et al. | 708/142 |
| 5,150,118 A | * | 9/1992 | Finkle et al. | 341/23 |
| 5,241,303 A | * | 8/1993 | Register et al. | 345/168 |
| 5,422,783 A | * | 6/1995 | Darbee | 361/679.08 |
| 5,694,123 A | * | 12/1997 | Selker et al. | 341/22 |
| 6,597,343 B1 | * | 7/2003 | Akiyama et al. | 345/168 |
| 6,685,369 B2 | * | 2/2004 | Lien | 400/472 |
| 6,965,076 B2 | * | 11/2005 | Wu | 174/541 |
| 7,123,241 B2 | * | 10/2006 | Bathiche | 345/168 |
| 2006/0098397 A1 | * | 5/2006 | Chou | 361/680 |
| 2006/0268528 A1 | * | 11/2006 | Zadesky et al. | 361/728 |
| 2007/0008289 A1 | * | 1/2007 | Franks et al. | 345/168 |
| 2008/0304214 A1 | * | 12/2008 | Nakajima | 361/680 |
| 2010/0177045 A1 | * | 7/2010 | Lu | 345/168 |
| 2011/0038116 A1 | * | 2/2011 | Tseng | 361/679.09 |

* cited by examiner

*Primary Examiner* — Jinhee Lee
*Assistant Examiner* — Anthony Q Edwards

(57) ABSTRACT

A keyboard includes a casing, a retaining frame, and a keyboard module. The casing is made from a metallic sheet and has upper and lower parts. The lower part is bent from front and rear ends of the upper part so as to define a gap between the upper and lower parts and two opposite side openings. The casing is formed with a central hole extending through the upper part and in spatial communication with the gap and the side openings. The retaining frame is received detachably in the gap of the casing, has a loop-shaped frame body disposed around the central hole of the casing, and is insertable through one of the side openings of the casing into the gap of the casing. The keyboard module is received in the central hole of the casing and engages the frame body of the retaining frame in a tongue-and-groove engaging manner.

10 Claims, 12 Drawing Sheets

KEYBOARD

BACKGROUND OF THE INVENTION

1. Field of the Invention

This invention relates to a keyboard, more particularly to a keyboard having a low profile.

2. Description of the Related Art

FIGS. 1 and 2 illustrate a conventional keyboard including a solid aluminum plate 1, a keyboard module 2 disposed above the solid aluminum plate 1, and a plastic base plate 3 disposed under the solid aluminum plate 1. The base plate 3 is provided with a hollow protrusion 301 for receiving a printed circuit board (not shown) and a USB port (not shown). A metallic base plate 201 of the keyboard module 2 is secured to the solid aluminum plate 1 by laser welding. The plastic base plate 3 is adhesively attached to the solid aluminum plate 1 by an adhesive (not shown). Although the conventional keyboard has a low profile, i.e., it is thin, it is disadvantageous in that the aforesaid laser welding increases the manufacturing costs and that the aforesaid adhesive attachment reduces the manufacturing throughput in production of the keyboard.

SUMMARY OF THE INVENTION

Therefore, the object of the present invention is to provide a keyboard that can overcome the aforesaid drawbacks associated with the prior art.

According to this invention, there is provided a keyboard that comprises a casing, a retaining frame, and a keyboard module. The casing is made from a metallic sheet and has upper and lower parts. The upper part has front and rear ends opposite to each other in a first direction. The lower part is bent from the front and rear ends of the upper part so as to define a gap between the upper and lower parts and two opposite side openings of the casing opposite to each other in a second direction transverse to the first direction. The casing is formed with a central hole extending through the upper part and in spatial communication with the gap and the side openings. The retaining frame is received detachably in the gap of the casing and has a loop-shaped frame body disposed around the central hole of the casing. The retaining frame is insertable through one of the side openings of the casing into the gap of the casing. The keyboard module is received in the central hole of the casing, engages the frame body of the retaining frame in a tongue-and-groove engaging manner, and has a plurality of pressable key caps protruding outwardly through the central hole of the casing.

BRIEF DESCRIPTION OF THE DRAWING

Other features and advantages of the present invention will become apparent in the following detailed description of the preferred embodiment of this invention, with reference to the accompanying drawings, in which.

DETAILED DESCRIPTION OF THE PREFERRED EMBODIMENT

Figure 1:
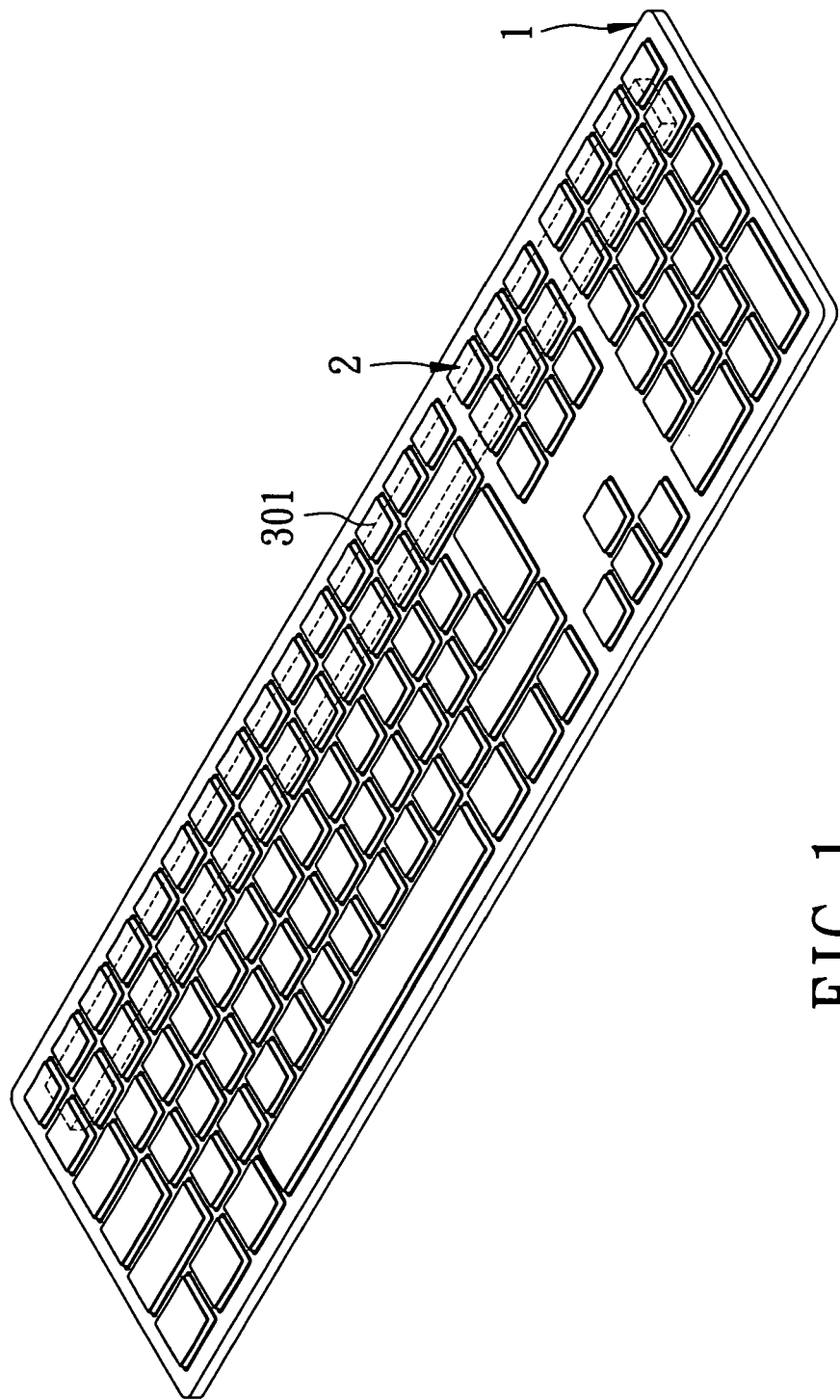
FIG. 1 is a perspective view of a conventional keyboard.
Figure 2:
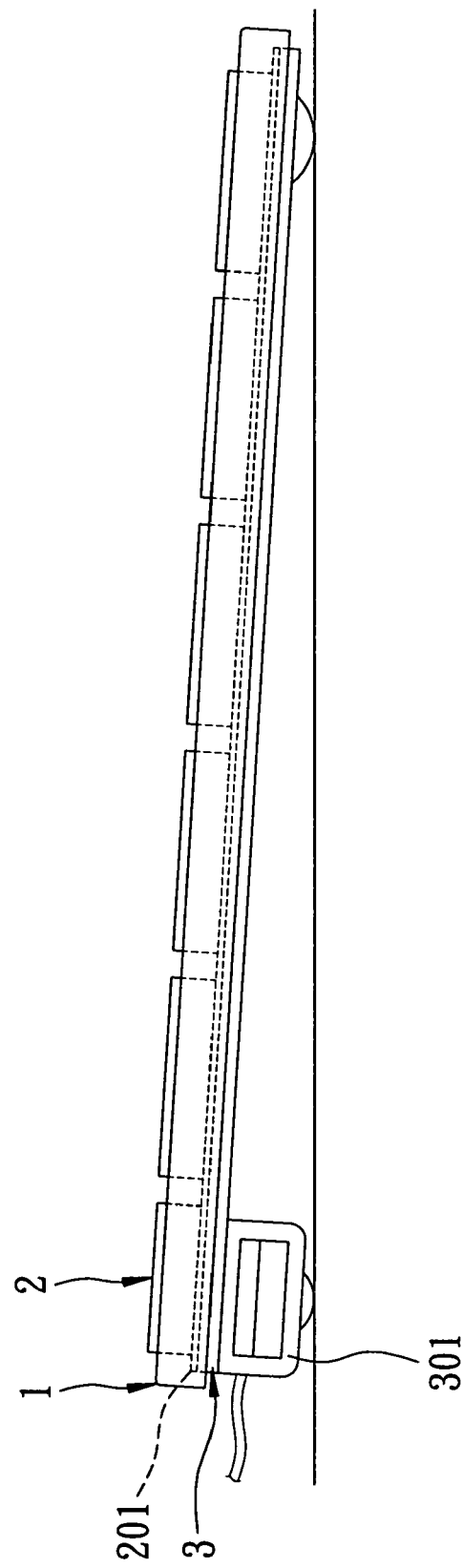
FIG. 2 is a schematic side view of the conventional keyboard.
Figure 3:
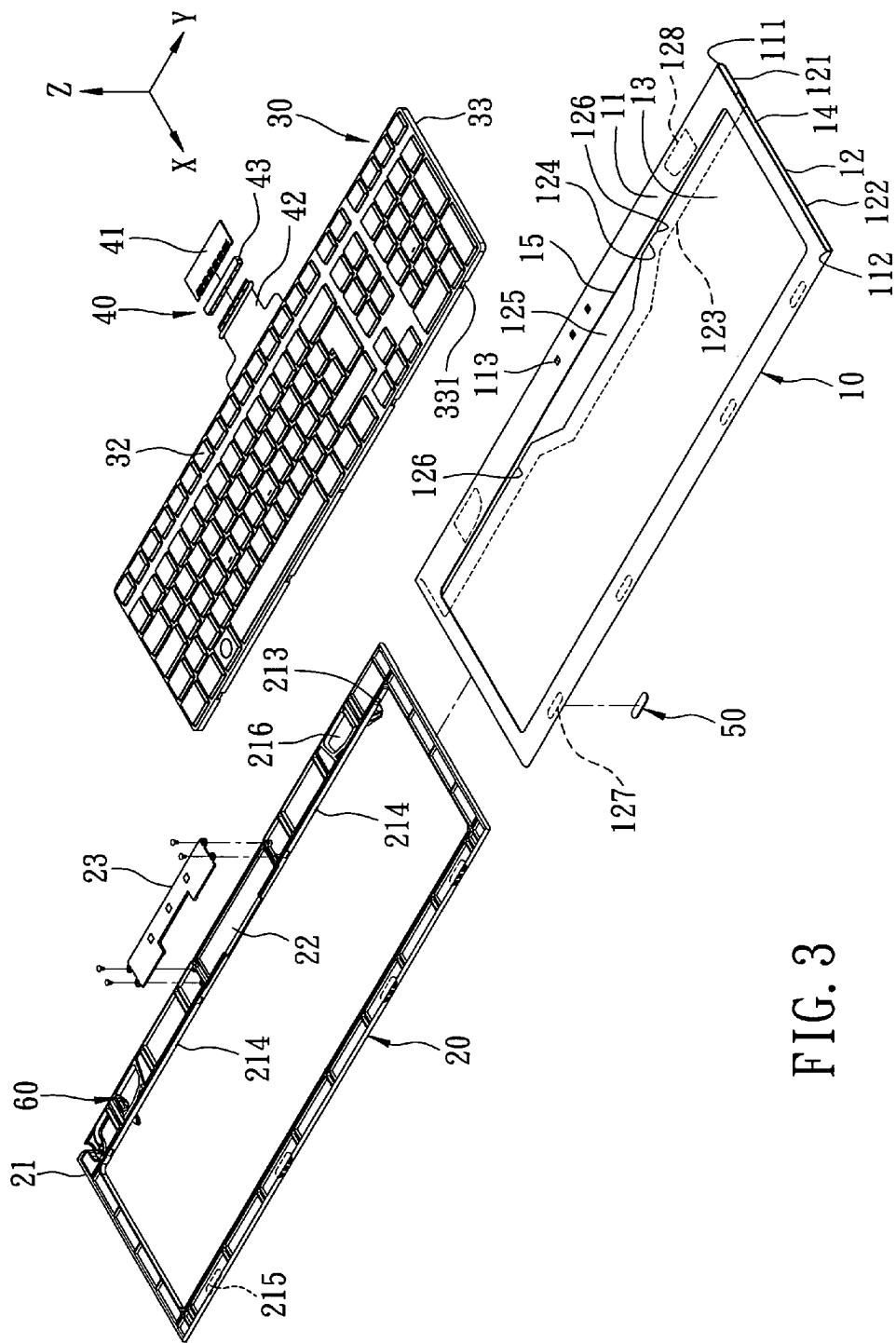
FIG. 3 is an exploded perspective view of the preferred embodiment of a keyboard according to this invention.
Figure 4:
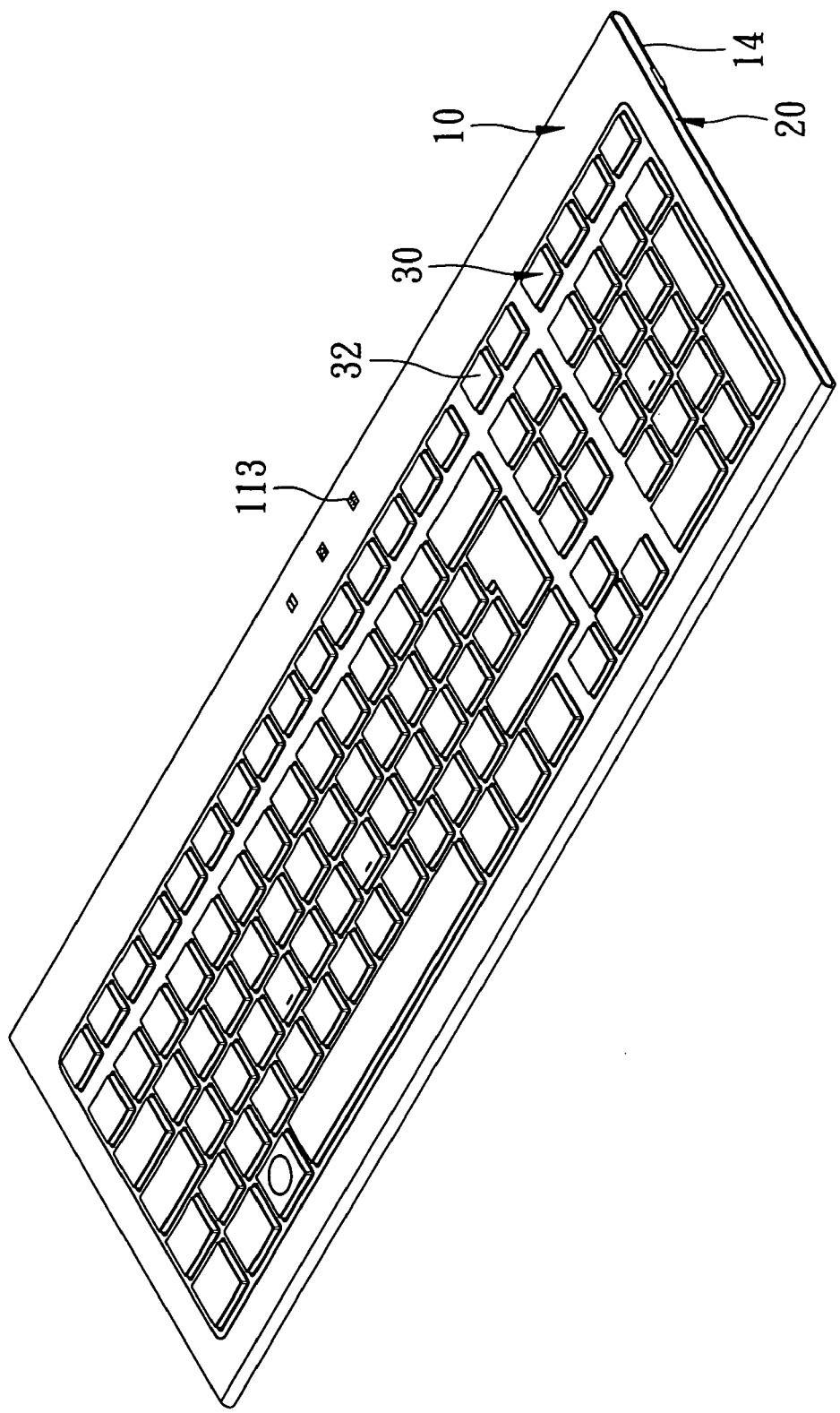
FIG. 4 is an assembled perspective view of the preferred embodiment.
Figure 5:
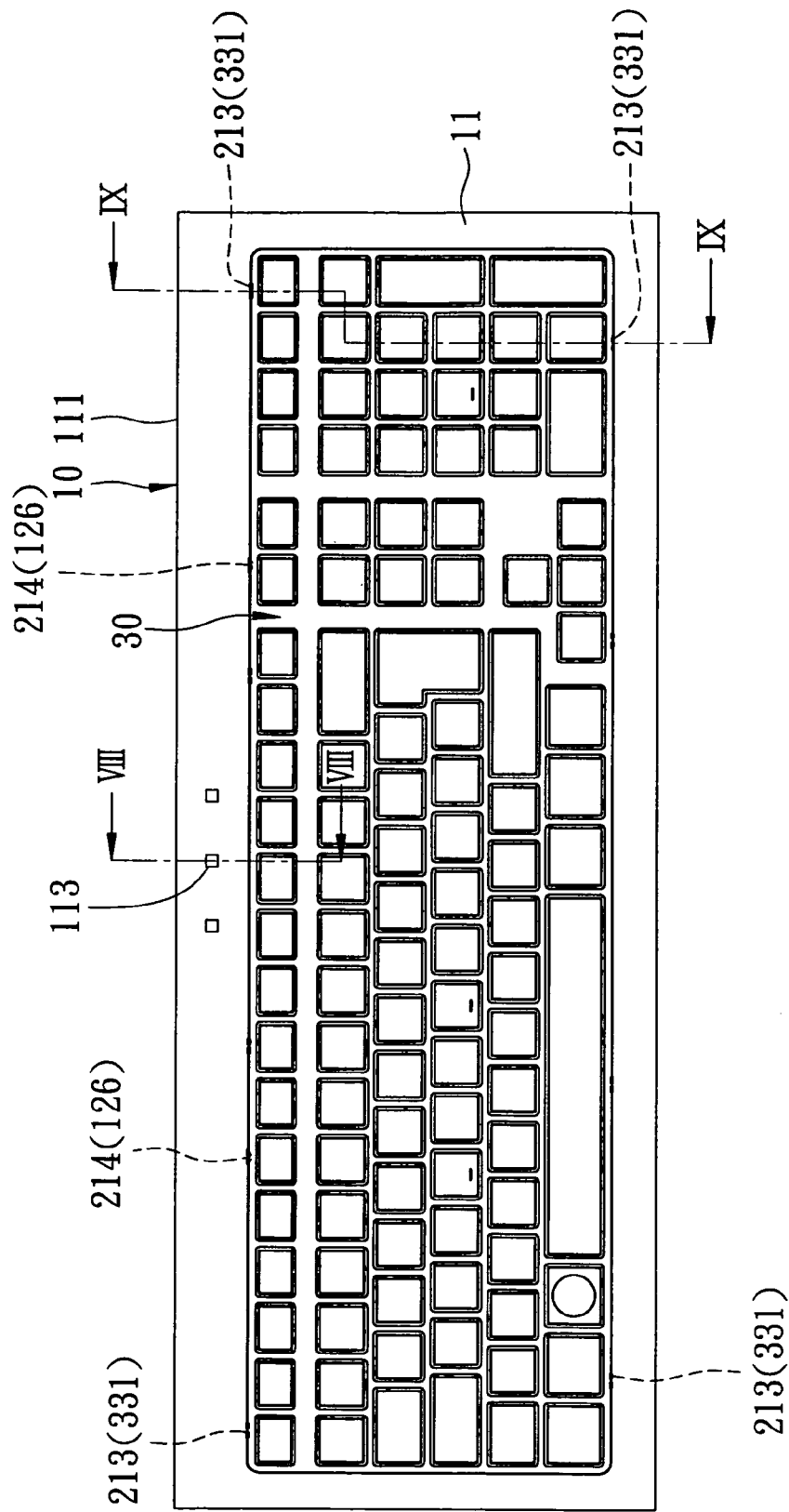
FIG. 5 is a top view of the preferred embodiment.
Figure 6:
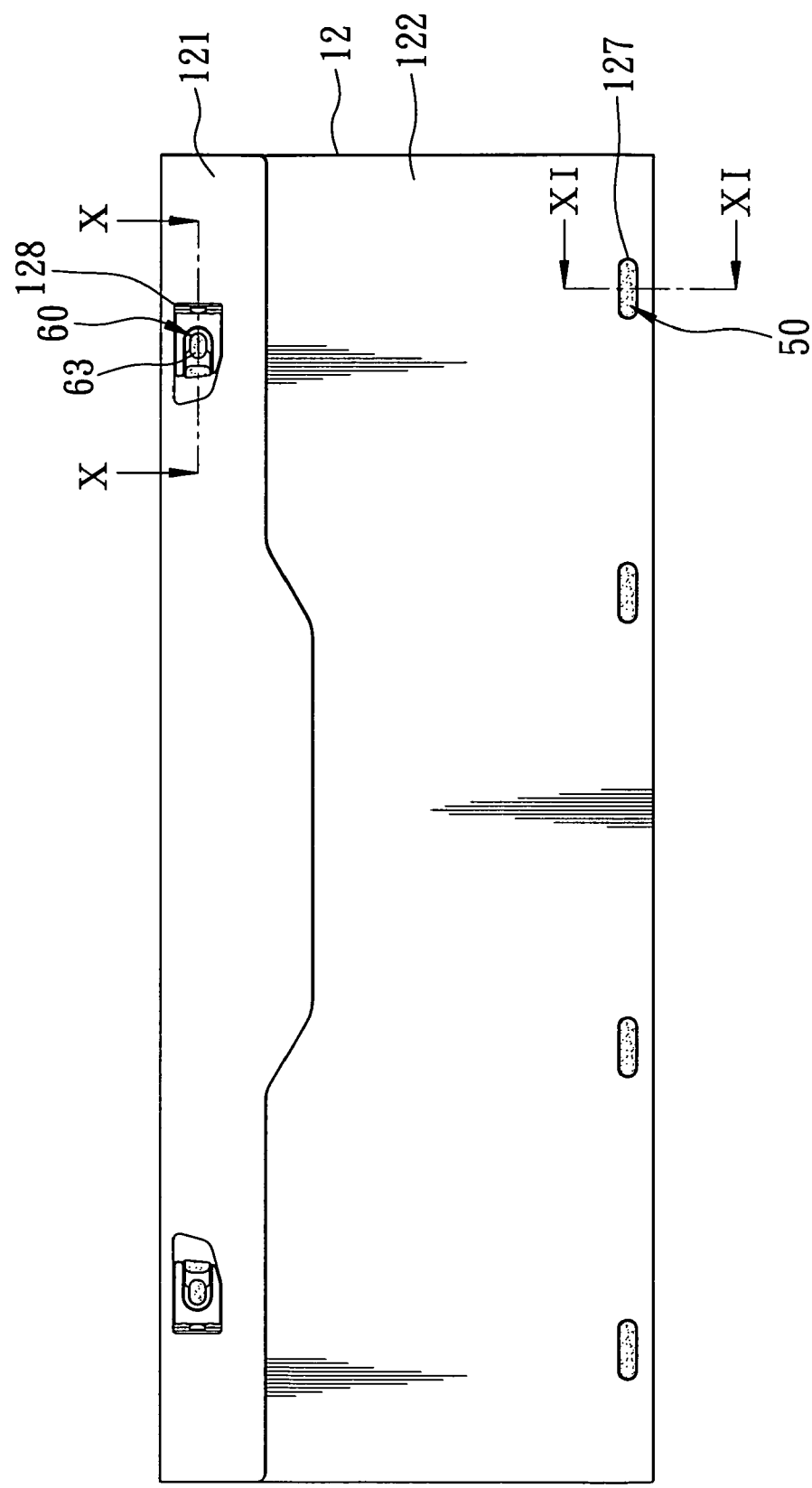
FIG. 6 is a bottom view of the preferred embodiment.
Figure 7:
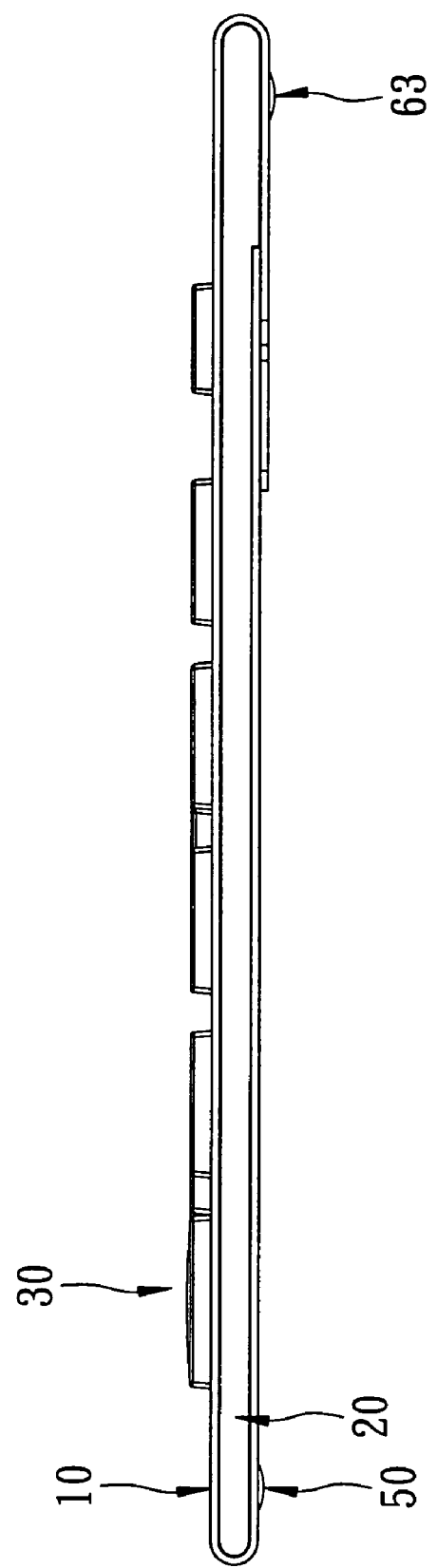
FIG. 7 is a side view of the preferred embodiment.

Referring to FIGS. 3 to 7, the preferred embodiment of a keyboard according to this invention includes a casing 10, a retaining frame 20, a keyboard module 30, a circuit board assembly 40, a plurality of anti-slip pads 50, and two legs 60.

The casing 10 is made from a metallic sheet and has upper and lower parts 11, 12. The upper part 11 has front and rear ends 111, 112 opposite to each other in a first direction (X). The lower part 12 is bent from the front and rear ends 111, 112 of the upper part 11 so as to define a gap 13 between the upper and lower parts 11, 12 and two opposite side openings 14 of the casing 10 opposite to each other in a second direction (Y) transverse to the first direction (X). The casing 10 is formed with a rectangular central hole 15 extending through the upper part 11 and in spatial communication with the gap 13 and the side openings 14.

The upper part 11 of the casing 10 further has a plurality of display regions 113, each of which is disposed between the front end 111 of the upper part 11 and a periphery of the central hole 15 and is formed with a plurality of holes 114 (see FIG. 8) cooperatively defining a predetermined display pattern.

The lower part 12 of the casing 10 has first and second portions 121, 122 extending and bent from the front and rear ends 111, 112 of the upper part 11 of the casing 10, respectively. Each of the first and second portions 121, 122 of the lower part 12 has a free end 123, 124. The free ends 123, 124 of the first and second portions 121, 122 of the lower part 12 are stacked one above the other. In this embodiment, the free end 124 of the second portion 122 of the lower part 12 is stacked above the free end 123 of the first portion 121 of the lower part 12.

The lower part 12 of the casing 10 further has a recess 125 indented inwardly from the free end 124 of the second portion 122 of the lower part 12 and disposed below and in spatial communication with the central hole 15 of the casing 10, and two retaining grooves 126 respectively disposed at two opposite sides of the recess 125 and opposite to each other in the second direction (Y). In addition, the lower part 12 of the casing 10 is formed with a plurality of first through-holes 127 disposed adjacent to the rear end 112 of the upper part 11 of the casing 10, and two second through-holes 128 disposed adjacent to the front end 111 of the upper part 11 of the casing 10.

Referring to FIGS. 3 to 9, the retaining frame 20 is received detachably in the gap 13 of the casing 10 and has a rectangular loop-shaped frame body 21 disposed around the central hole 15 of the casing 10. The retaining frame 20 is insertable through one of the side openings 14 of the casing 10 into the gap 13 of the casing 10.

Figure 12:
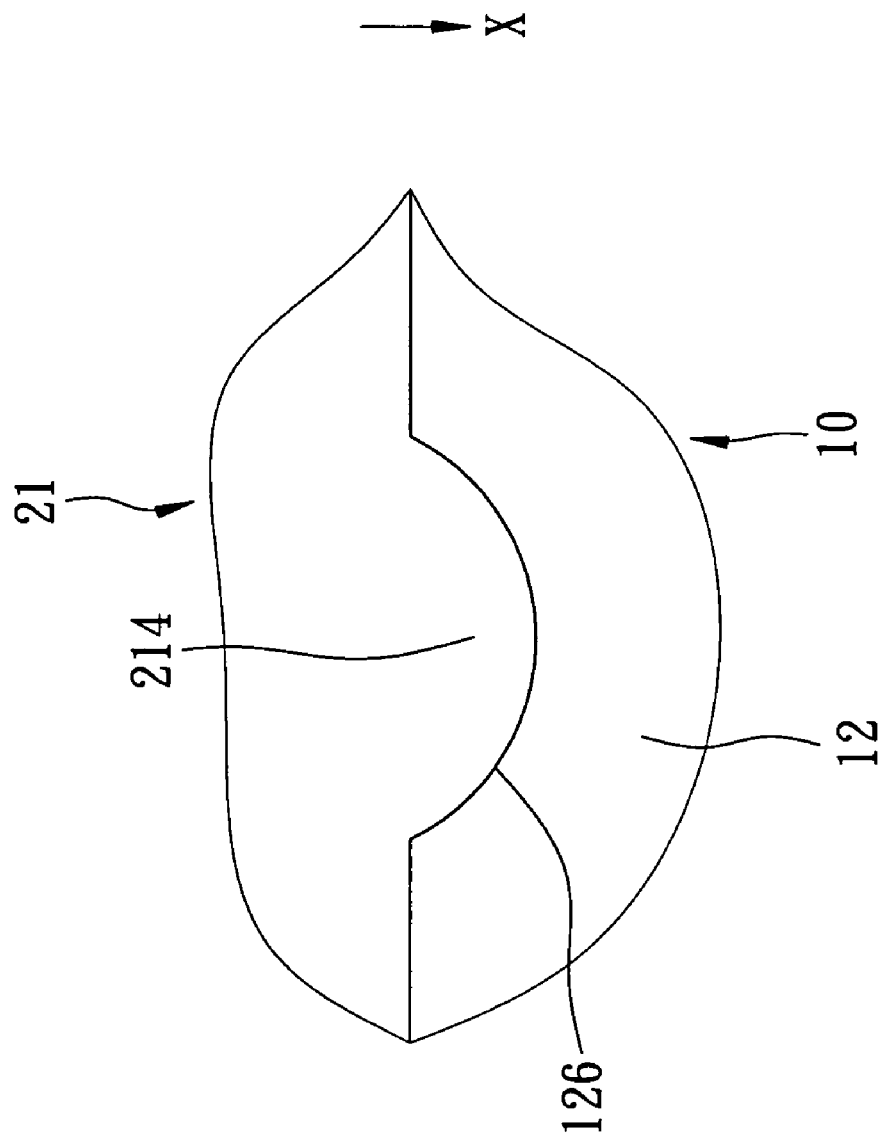
FIG. 12 is a partly enlarged view illustrating the engagement of a casing and a retaining frame of the preferred embodiment.

The frame body 21 of the retaining frame 20 has a plurality of flexible arms 211 each of which extends substantially in a third direction (Z) transverse to the first and second directions (X, Y), has a free end 212, and is bendable toward and away from the keyboard module 30. The frame body 21 further has a plurality of first retaining tongues 213 protruding from the free ends 212 of the flexible arms 211 in a transverse direction relative to the third direction (Z) (see FIG. 9), respectively, and two second retaining tongues 214 protruding therefrom in the first direction (X) and engaging the retaining grooves 126 of the lower part 12 of the casing 10 (see FIG. 12), respectively. The frame body 21 is formed with a plurality of blind holes 215 aligned with the first through-holes 127 of the lower part 12 of the casing 10 in the third direction (Z), respectively, and two accommodating holes 216 aligned with the second through-holes 128 of the lower part 12 of the casing 10 in the third direction (Z), respectively.

The retaining frame 20 is formed with a storage hole 22 extending through the frame body 21. The retaining frame 20 is provided with a lens 23 disposed in the storage hole 22 of the retaining frame 20 and having a plurality of light scattering elements 231 (see FIG. 8) aligned with the display regions 113 of the upper part 11 of the casing 10 in the third direction (Z), respectively.

The keyboard module 30 is received in the central hole 15 of the casing 10, engages the frame body 21 of the retaining frame 20 in a tongue-and-groove engaging manner, and has a circuit board 31 (see FIG. 8), a plurality of pressable key caps 32 protruding outwardly through the central hole 15 of the casing 10, and a peripheral wall 33 surrounding the key caps 32 and formed with a plurality of retaining grooves 331 engaging the first retaining tongues 213 of the frame body 21 of the retaining frame 20, respectively.

Figure 8:
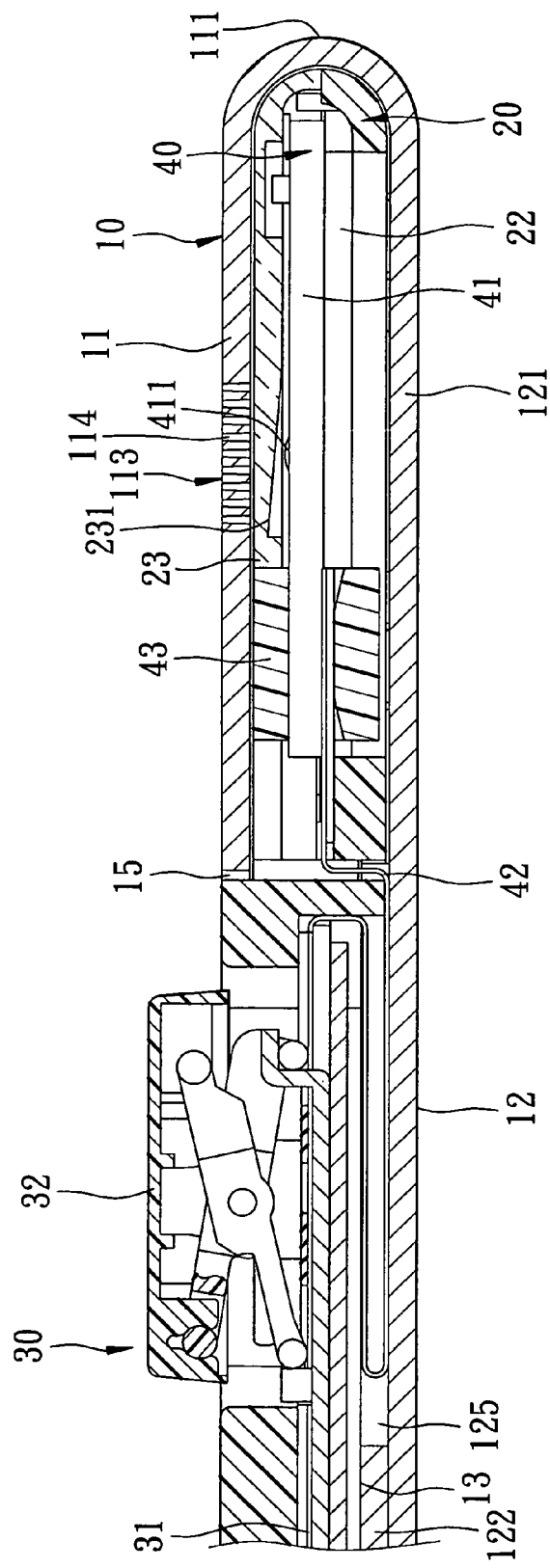
FIG. 8 is a fragmentary sectional view of the preferred embodiment taken along line VIII-VIII in FIG. 5.
Figure 9:
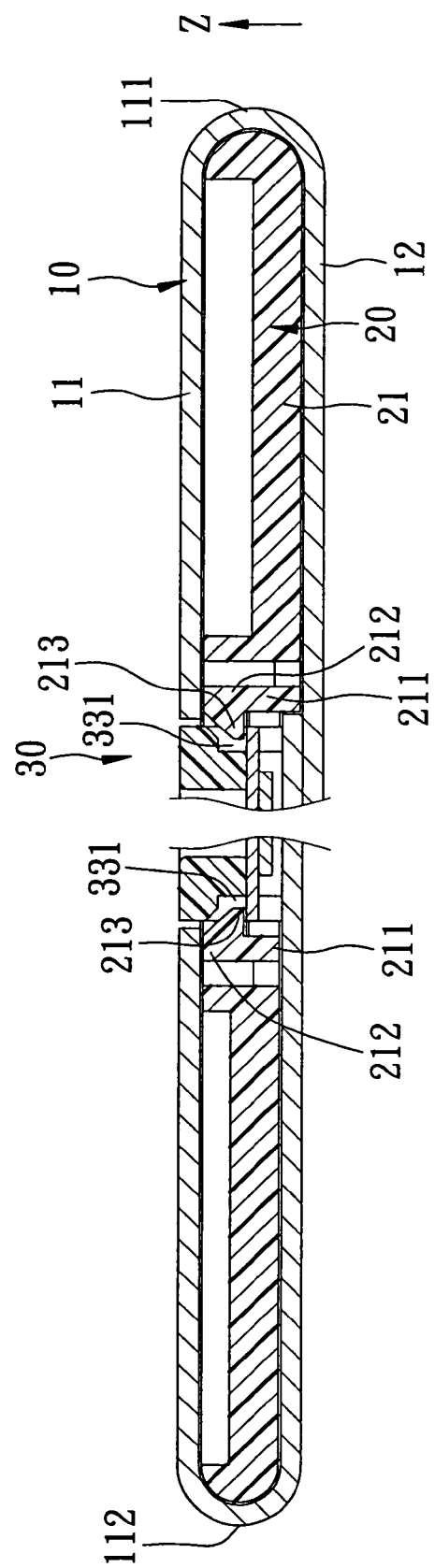
FIG. 9 is a fragmentary sectional view of the preferred embodiment taken along line IX-IX in FIG. 5.
Figure 10:
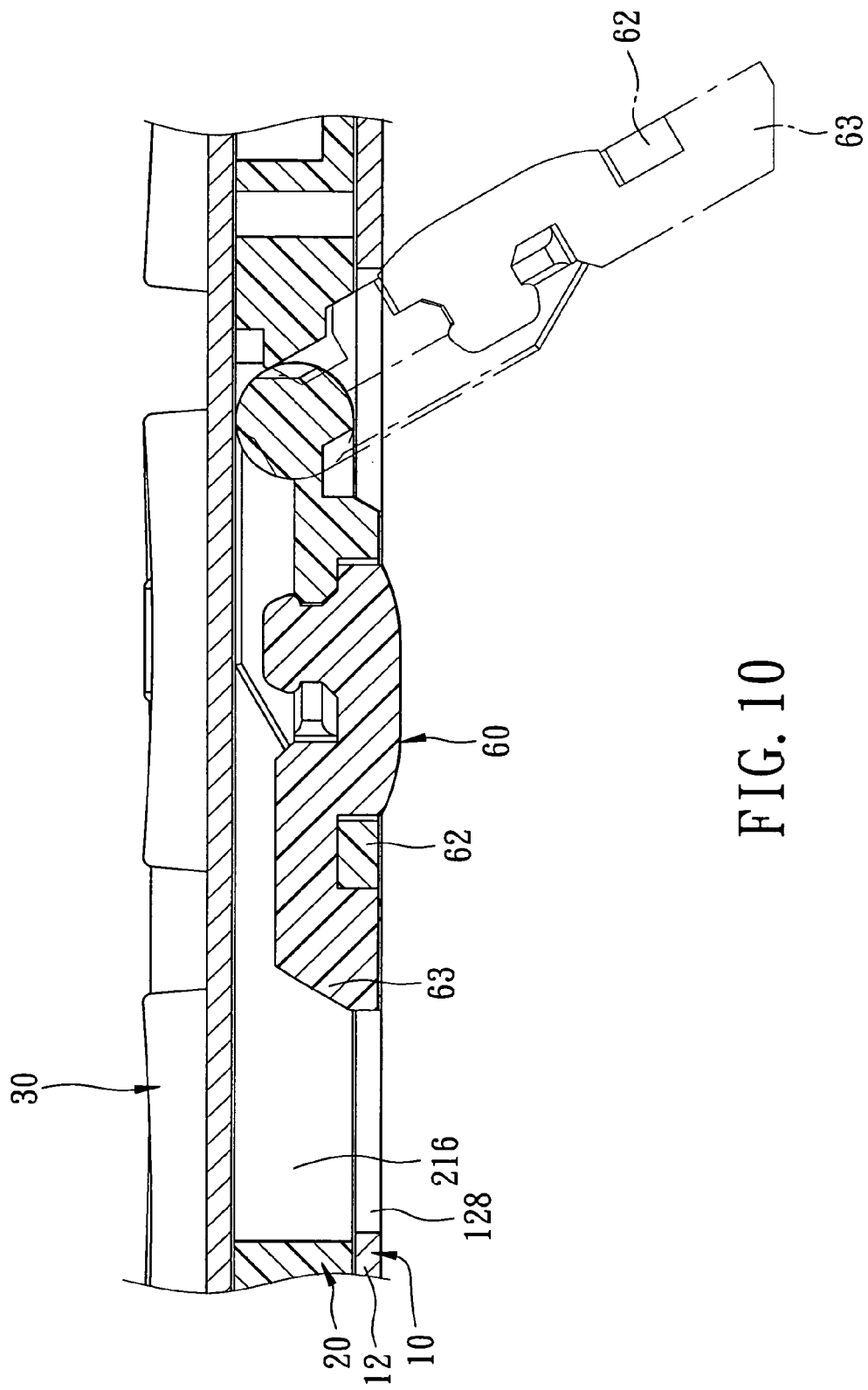
FIG. 10 is a fragmentary sectional view of the preferred embodiment taken along line X-X in FIG. 6.
Figure 11:
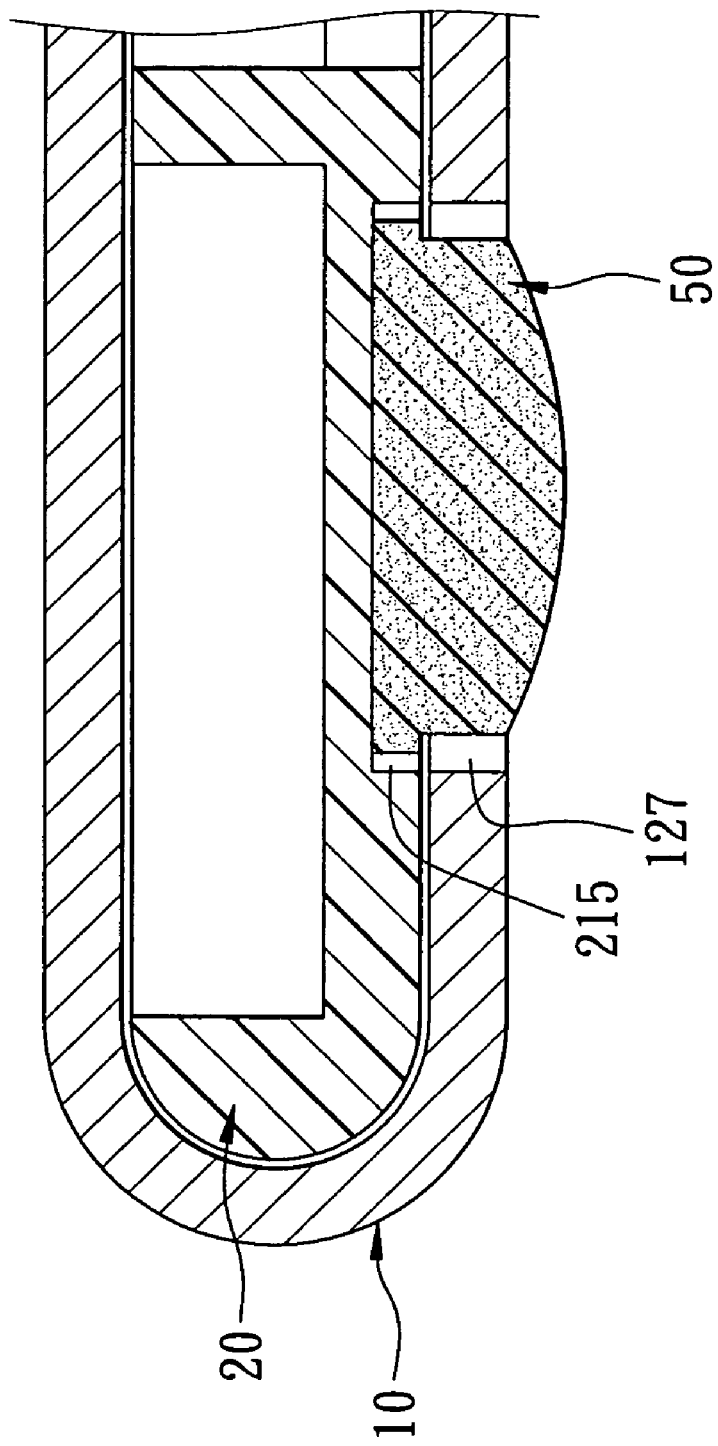
FIG. 11 is a fragmentary sectional view of the preferred embodiment taken along line XI-XI in FIG. 6.

Referring to FIGS. 3 to 8, the circuit board assembly 40 includes a printed circuit board 41 disposed in the storage hole 22 of the retaining frame 20 below the lens 23 of the retaining frame 20, a transmission member 42 electrically connected to the circuit board 31 of the keyboard module 30, and a fastener 43 for fastening the transmission member 42 to the printed circuit board 41 such that the transmission member 42 is electrically connected to and extends from the printed circuit board 41 into the recess 125 of the lower part 12 of the casing 10. Referring to FIG. 8, the printed circuit board 41 is provided with a plurality of light emitting elements 411 thereon that are aligned with the light scattering elements 231 of the lens 23 in the third direction (Z), respectively.

Referring to FIGS. 3 to 7 and 11, the anti-slip pads 50 are fitted securely in the blind holes 215 of the frame body 21 of the retaining frame 20, and extend outwardly through the first through-holes 127 of the lower part 12 of the casing 10, respectively.

Referring to FIGS. 3 to 7 and 10, the legs 60 respectively extend into the accommodating holes 216 in the frame body 21 of the retaining frame 20, are pivoted to the frame body 21, and are rotatable relative to the frame body 21 between a first position (see the solid lines in FIG. 10), in which the legs 60 are fully received in the accommodating holes 216 of the frame body 21, and a second position (see the dotted lines in FIG. 10), in which the legs 60 extend outwardly through the accommodating holes 216 of the frame body 21 and the second through-holes 128 of the lower part 12 of the casing 10, respectively. Each of the legs 60 has a free end 62 provided with an anti-slip block 63.

Referring to FIGS. 3 and 8 to 11, in assembly, the printed circuit board 41 is disposed in the storage hole 22 of the retaining frame 20 first, the retaining frame 20 is then inserted through one of the side openings 14 of the casing 10 into the gap 13 of the casing 10, followed by inserting the keyboard module 30 into the central hole 15 of the casing 10 with the transmission member 42 being received in the recess 125 of the lower part 12 of the casing 10. The legs 60 are subsequently pivoted to the frame body 21, and the anti-slip pads 50 are fitted securely in the blind holes 215 of the frame body 21 of the retaining frame 20, respectively.

The light emitted from each of the light emitting elements 411 on the printed circuit board 41 is scattered by the respective one of the light scattering elements 231 of the lens 23, and is transmitted through the holes 114 of the respective one of the display regions 113 of the upper part 11 of the casing 10 so as to show the working status of the keyboard.

In sum, assembly of the casing 10, the retaining frame 20 and the keyboard module 30 into the keyboard is easy and fast. Since the aforesaid laser welding and adhesive attachment employed in the prior art are not needed in assembly of the keyboard of this invention, the manufacturing costs can be reduced and the manufacturing throughput can be increased in the production of the keyboard.

While the present invention has been described in connection with what is considered the most practical and preferred embodiment, it is understood that this invention is not limited to the disclosed embodiment but is intended to cover various arrangements included within the spirit and scope of the broadest interpretation and equivalent arrangements.

What is claimed is:

1. A keyboard comprising:
   a casing made from a metallic sheet and having upper and lower parts, said upper part having front and rear ends opposite to each other in a first direction, said lower part being bent from said front and rear ends of said upper part so as to define a gap between said upper and lower parts and two opposite side openings of said casing opposite to each other in a second direction transverse to the first direction, said casing being formed with a central hole extending through said upper part and in spatial communication with said gap and said side openings;
   a retaining frame received detachably in said gap of said casing and having a loop-shaped frame body disposed around said central hole of said casing, said retaining frame being insertable through one of said side openings of said casing into said gap of said casing; and
   a keyboard module received in said central hole of said casing, engaging said frame body of said retaining frame in a tongue-and-groove engaging manner, and having a plurality of pressable key caps protruding outwardly through said central hole of said casing.

2. The keyboard of claim 1, wherein said frame body of said retaining frame has a plurality of first retaining tongues protruding therefrom, said keyboard module further having a plurality of retaining grooves engaging said first retaining tongues of said frame body of said retaining frame, respectively.

3. The keyboard of claim 2, wherein said frame body of said retaining frame further has a plurality of flexible arms, each of which extends substantially in a third direction transverse to the first and second directions and has a free end, said first retaining tongues protruding from said free ends of said flexible arms in a transverse direction relative to the third direction, respectively, each of said flexible arms being bendable toward and away from said keyboard module.

4. The keyboard of claim 1, wherein said lower part of said casing has first and second portions extending and bent from said front and rear ends of said upper part of said casing, respectively, each of said first and second portions of said lower part having a free end, said free ends of said first and second portions of said lower part being stacked one above the other.

5. The keyboard of claim 4, wherein said frame body of said retaining frame further has a plurality of second retaining tongues protruding therefrom in the first direction, said lower part of said casing having a plurality of retaining grooves engaging said second retaining tongues of said frame body of said second retaining frame, respectively.

6. The keyboard of claim 5, wherein said lower part of said casing further has a recess indented inwardly from said free end of said second portion of said lower part of said casing and disposed below and in spatial communication with said central hole of said casing, said retaining frame being formed with a storage hole extending through said frame body, said keyboard further comprising a circuit board assembly which includes a printed circuit board disposed in said storage hole of said retaining frame and a transmission member electrically connected to and extending from said printed circuit board into said recess of said lower part of said casing.

7. The keyboard of claim 6, wherein said printed circuit board is provided with a plurality of light emitting elements thereon, said retaining frame being provided with a lens disposed in said storage hole of said retaining frame above said printed circuit board and having a plurality of light scattering elements aligned with said light emitting elements in the third direction, respectively, said upper part of said casing further having a plurality of display regions, each of which is formed with a plurality of holes and is aligned with a respective one of said light scattering elements in the third direction.

8. The keyboard of claim 1, wherein said lower part of said casing is formed with a plurality of first through-holes disposed adjacent to said rear end of said upper part of said casing, said frame body being formed with a plurality of blind holes aligned with said first through-holes of said lower part substantially in a third direction transverse to the first and second directions, respectively, said keyboard further comprising a plurality of anti-slip pads fitted securely in said blind holes of said frame body and extending outwardly through said first through-holes of said lower part, respectively.

9. The keyboard of claim 1, wherein said lower part of said casing is formed with two second through-holes disposed adjacent to said front end of said upper part of said casing, said frame body being formed with two accommodating holes aligned with said second through-holes of said lower part substantially in a third direction transverse to the first and second directions, respectively, said keyboard further comprising two legs respectively extending into said accommodating holes in said frame body, pivoted to said frame body, and rotatable relative to said frame body between a first position, in which said legs are fully received in said accommodating holes of said frame body, and a second position, in which said legs extend outwardly through said accommodating holes of said frame body and said second through-holes of said lower part, respectively.

10. The keyboard of claim 9, wherein each of said legs has a free end provided with an anti-slip block.

* * * * *